(12) United States Patent
Tomita et al.

(10) Patent No.: US 7,751,018 B2
(45) Date of Patent: Jul. 6, 2010

(54) LIQUID CRYSTAL DISPLAY ELEMENT COMPRISING A LIQUID CRYSTAL INJECTION PATH INCLUDING AN S-SHAPED STRUCTURE WITH AT LEAST ONE CORNER

(75) Inventors: Junji Tomita, Kawasaki (JP); Masaki Nose, Kawasaki (JP); Tomohisa Shingai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 11/712,344

(22) Filed: Feb. 28, 2007

(65) Prior Publication Data

US 2007/0152995 A1 Jul. 5, 2007

Related U.S. Application Data

(63) Continuation of application No. PCT/JP2004/013380, filed on Sep. 14, 2004.

(51) Int. Cl.
*G02F 1/1339* (2006.01)
(52) U.S. Cl. .................... 349/154; 349/155; 349/156
(58) Field of Classification Search ............ 349/142, 349/156, 89, 155, 154, 175, 86, 10, 76, 158, 349/153, 189; 345/211
See application file for complete search history.

(56) References Cited

U.S. PATENT DOCUMENTS 5,952,676 A * 9/1999 Sato et al. ............... 257/59

| 5,978,062 | A | 11/1999 | Liang et al. |
| 6,208,402 | B1 | 3/2001 | Tajima |
| 6,503,012 | B2 * | 1/2003 | Allen et al. ............ 400/703 |
| 2002/0047819 | A1 | 4/2002 | Suehiro et al. |
| 2005/0243262 | A1 * | 11/2005 | Kim et al. ............... 349/156 |

FOREIGN PATENT DOCUMENTS

| EP | 0 278 721 | 8/1988 |
| JP | 55-045035 | 3/1980 |

(Continued)

OTHER PUBLICATIONS

Official Communication, European Patent Office, Nov. 15, 2007.

(Continued)

*Primary Examiner*—Thoi V Duong
(74) *Attorney, Agent, or Firm*—Greer, Burns & Crain, Ltd.

(57) ABSTRACT

A segment block 61, which is formed into a shape like the numeral eight ("8") constituted by seven segments 63, is connected to the adjacent segment block 61 by way of liquid crystal injection paths 62, each of which has a key-type S-shaped structure. Within the segment block 61, two pairs of segments 63 each consisting of one left and one right segment and which are located on the opposing upper and lower sides, are mutually connected by way of liquid crystal injection paths 64, each of which has a key-type S-shaped structure, and three segments 63 located at the upper, middle and lower parts are respectively connected to the liquid crystal injection paths 64 by way of linearly structured liquid crystal injection paths 65 that are vertically branched respectively from the liquid crystal injection paths 64.

10 Claims, 19 Drawing Sheets

FOREIGN PATENT DOCUMENTS

| | | |
|---|---|---|
| JP | 61-184518 | 8/1986 |
| JP | A-55-6311 | 1/1989 |
| JP | 7-30384 | 7/1995 |
| JP | A 10-232398 | 9/1998 |
| JP | 11-014973 | 1/1999 |
| JP | 11-153816 | 6/1999 |
| JP | 2001-059960 | 3/2001 |
| JP | 2002-236891 | 8/2002 |
| JP | 2002-328374 | 11/2002 |
| JP | 2003-123047 | 4/2003 |

OTHER PUBLICATIONS

Chinese Office Action, mailed Jun. 6, 2008, which corresponds to Chinese Application No. 200480043995.4.

* cited by examiner

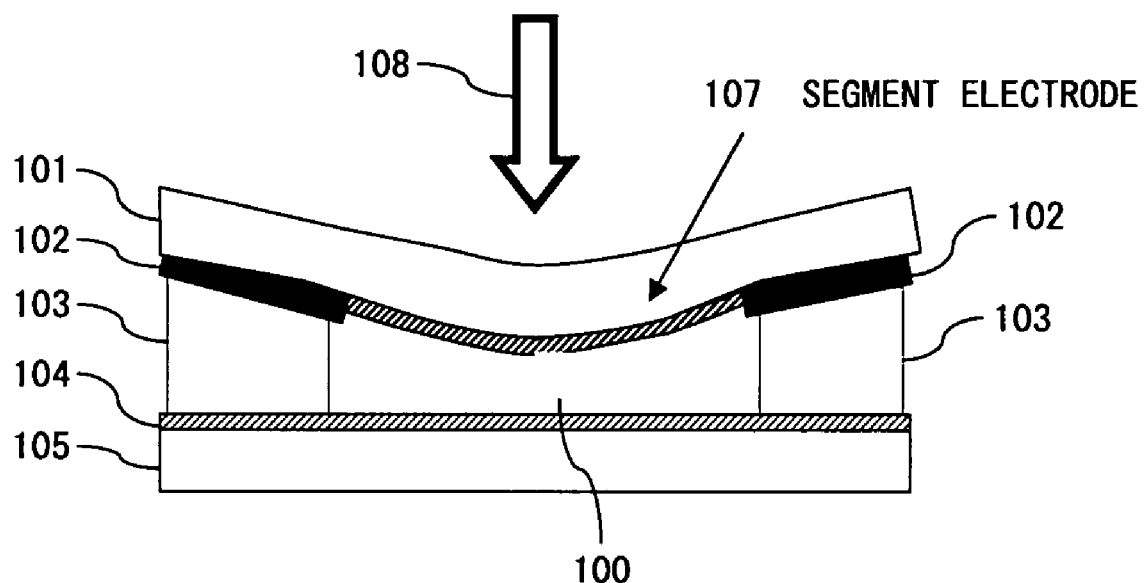
F I G. 1 2

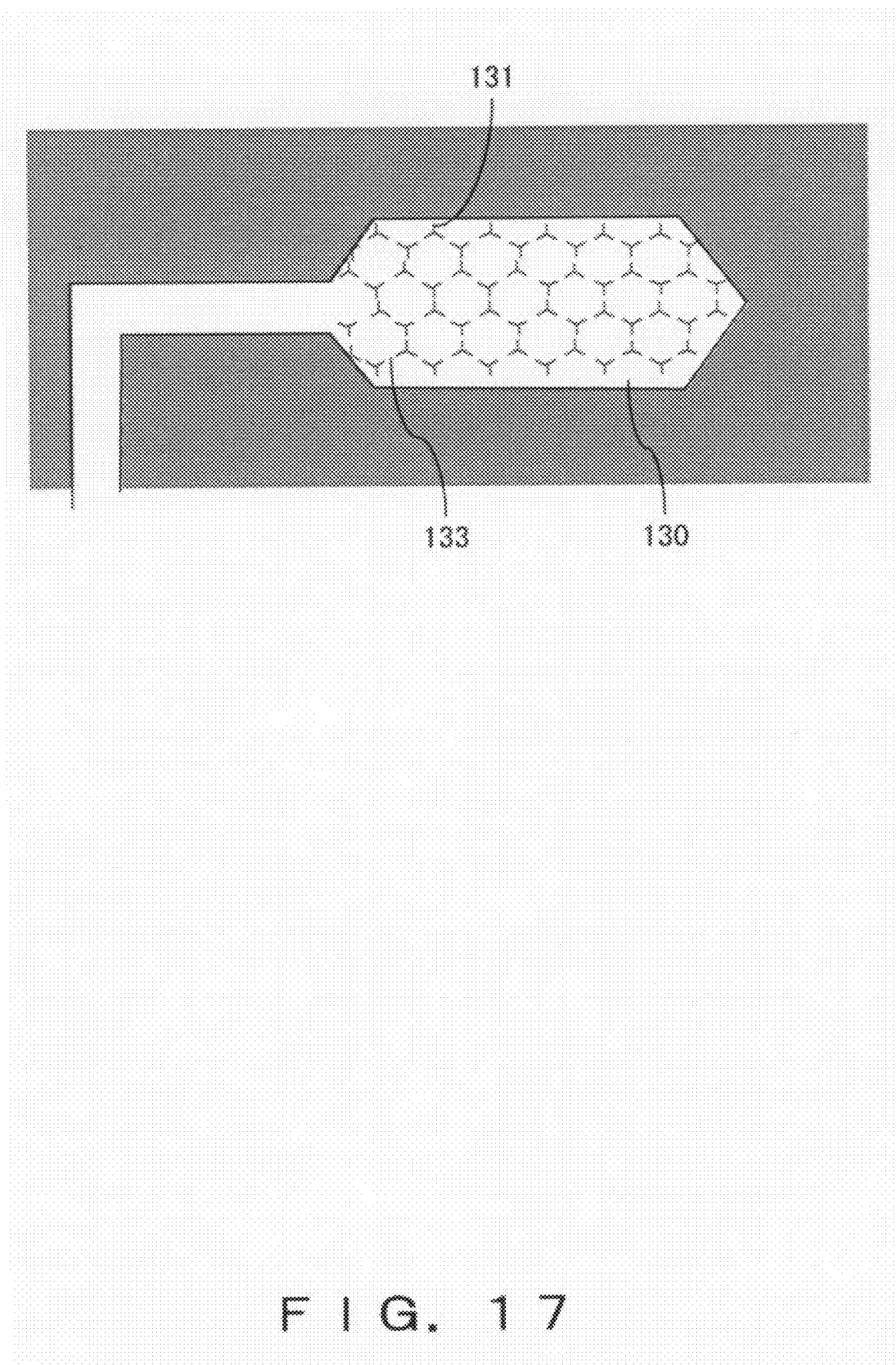
F I G. 17

LIQUID CRYSTAL DISPLAY ELEMENT COMPRISING A LIQUID CRYSTAL INJECTION PATH INCLUDING AN S-SHAPED STRUCTURE WITH AT LEAST ONE CORNER

CROSS REFERENCE TO RELATED APPLICATION

This application is a continuation of international PCT applications No. PCT/JP2004/013380 filed on Sep. 14, 2004.

BACKGROUND OF THE INVENTION

1. Field of the Invention

The present invention relates to a liquid crystal display element using, as a liquid crystal display material, liquid crystals that molecular orientation state is cholesteric phase (i.e., cholesteric liquid crystals), and in particular to a liquid crystal display element with a superior physical durability.

2. Description of the Related Art

Recent years have witnessed the beginning of the popularization of different techniques of radio frequency identification (RFID), including noncontact type IC cards, RF tags, and other such techniques, that are durable and convenient for use in industrial fields such as logistics, transportation, and other such fields that utilize a contact type IC card, barcode, or other such device. It is predicted that in the future there will be an accelerated prevalence of cards and tags performing radio communications with external apparatuses with along with the development of new application fields such as electronic money.

While excelling in information recording, the IC card has a problem in that its record content cannot be confirmed until a dedicated apparatus reads it. It is a problem since it is desired that the record content be confirmed for reward cards and coupon cards utilized in the public transportation field. For the conventional contact type IC cards, it has been proposed that there be a display that uses a magnetic flake that functions by utilizing a visible medium by means of thermal writing using substrate 74 on which a solid common electrode 74a is featured. The light absorption layer 75 turns a transparent state of the cholesteric liquid crystal into an opaque or black display. The light absorption layer 75 may be formed either on the inside of the common substrate or on the outside thereof. Alternatively, the common electrode 74 may be formed by a material having a light absorption property (in which case a process for forming a light absorption layer is not required).

(4) Next, a segment substrate 76 and a common substrate 77, both of which are individually formed as described above, are laminated via a heating process.

(5) Next, the liquid crystals are injected from the liquid crystal injection hole of the liquid crystal layer 77 and all the segments 63 are filled with the liquid crystals by way of the liquid crystal injection paths 62 and 64. The liquid crystals can be injected by means of, for example, a vacuum injection method.

For the LCE element 70 shown in FIG. 9, the common electrode 74a of the common substrate 77 is electrically connected to a transfer electrode 71a of the segment substrate 76 with a conductive adhesive or other such device in order to draw the common electrode 74a of the common substrate 77 out of the segment substrate 76. The wall structure 73 comprises an adhesive property; a sealing material of a common liquid crystal structure may, however, be equipped on the periphery of the LCD element.

In a cholesteric LCD element that does not use a diffraction plate, the liquid crystals remain in the liquid crystal injection path, and therefore a light shield mask is required to hide the liquid crystals remaining in the liquid crystal injection path (refer to the above described process (1)).

In the case of the LCD apparatus of the antiferroelectric liquid crystal shown in FIG. 4, only a few parts of the segments (i.e., segments at the upper, middle and lower parts of the right a leuco dye. Such a contact type IC card requires a dedicated use apparatus for inserting the IC card, with the dedicated use apparatus being built in with a display/write apparatus equipped with a magnetic head or thermal head. However, a write head comprised by a contact type IC card dedicated use apparatus cannot be equipped for use in noncontact type IC cards and RF tags, which are predicted to become more popular in the future. Consequently, a display must be realized that employs an electric signal that is supplied wirelessly; thus, a display that functions by means of a liquid crystal display (LCD) system and that is electrically drivable is required, such as an electrophoresis system or other such system.

Patent documents 1 and 2 below, for which applications have been submitted to the Japan Patent Office, are available as reference documents related to an IC card and an RF tag, either of which can comprise a display device.

Patent document 1: Japanese registered utility model Kokai number (1995)30384

Patent document 2: Japanese unscreened Patent Application Kokai number (2002)236891

Patent document 1 (on page 3, column 6, line 37) also notes the consideration of a noncontact type IC card and of an RF tag. Patent document 2 describes the structure of a noncontact type IC card in detail. Patent documents 1 and 2 propose an LCD element as one candidate for display elements. If an LCD element is used as a display element for a noncontact type IC card, ferroelectric liquid crystal (FLC) and cholesteric liquid crystal (ChLCD), both of which continue to show their displays after the power is turned off, are conceivable candidates for the liquid crystal material. The cholesteric liquid crystal is sometimes called a chiral nematic liquid crystal.

The reason that conventional LCD elements are unable to act as display elements for an IC card or an RF tag is their lack of physical durability. A display element cannot be adopted for an IC card unless, for example, it possesses bending resistance and it is environmental test, both of which characteristics are specified by Japanese Industry Standard (JIS), and common LCD elements have not been able to meet those conditions.

For example, if an IC card body is 85 mm on the long side, it must be able to withstand being bent 2 cm greater or equal 500 times at the center thereof without breaking. Conventional LCD elements have not been able to pass this durability test due to substrate breakage, the orientation of the liquid crystal molecules being disturbed, the seal material peeling off, and other such problems.

The contact type and hybrid type (having functions of both contact and noncontact types) IC cards undergo a strong pressure from a transport roller (i.e., a roller pressure) on the card surface when they are inserted into a readout apparatus. The conventional LCD element suffers from the liquid crystals being pushed to one side by the roller pressure, resulting in a broken seal, spillage of the liquid crystal, and eventually loss of its function as an LCD element.

The applicant of the present invention (noted as "present applicant" or "we" hereinafter) has accordingly proposed, by virtue of patent document 3 (i.e., Japanese Patent Application Kokai number (2003)998646), a thin structure LCD element using a cholesteric liquid crystal which is mountable onto an IC card of a standard thickness (of 0.76 mm) while meeting the above described requirement of the JIS specification. In the meantime, patent document 4 (i.e., Japanese unscreened Patent Application Kokai number 2002(328374)) has proposed a structure of an LCD element that improves durability by using an antiferroelectric liquid crystal (AFLC). However, in an AFLC, it is fundamentally difficult to maintain the orientation of the liquid crystals and it has a weakness in anti-shock resistance, and hence is inapplicable to an IC card. It also requires the use of a polarization plate, making it difficult to mount it onto an IC card of a standard thickness (of 0.76 mm).

The LCD element proposed by the above noted patent document 3 meets the durability requirement as per the JIS specifications. A further problem, however, remains to be solved: a cholesteric liquid crystal is faced with the situation of a human finger (noted as "finger" hereinafter) pressing, or fingers pinching, the display surface of the LCD element and thus warping or twisting it, resulting in such a force being added to the cholesteric liquid crystal changing display states. Additionally, the cholesteric liquid crystal has returns to its original state by being driven to display again.

Considering application to the IC card, the fact of its display being changed by a mere pressing with a finger (i.e., a pressing pressure) is a large problem, hampering the convenience of use even if a display state is restored by being to driven to display. The present applicant has carried out a verification test on the LCD element disclosed by patent document 3, obtaining a result verifying the fact that the configuration of the LCD element allows the display to change under the pressure of a finger pressing upon it (i.e., finger pressure).

FIG. 1 is a diagram showing the overall structure of the LCD element proposed by patent document 3, and FIG. 2 is an exploded diagram of the LCD element. FIG. 3 is a horizontal cross-sectional diagram of a wall structure (i.e., a wall material) and of a display part equipped on the inside of the LCD element. FIG. 4 is a diagram showing a part of a cross-section in the direction parallel to a layer including the liquid crystal cell and partition wall of the LCD element disclosed by patent document 4.

The LCD element proposed by patent document 3 is configured to sandwich a wall structure 3, a display part 4 and a light shield mask 5 between a segment board 1 and a common board 2.

As shown in FIG. 2, the wall structure 3 and display part 4 are equipped between the common board 2 and light shield mask 5. The thickness of the layer including the wall structure 3 and display part 4 is a few micrometers. In the example shown in FIG. 2, the display part 4 is constituted by four segment blocks 4a. The following description calls the layer including the wall structure 3 and display part 4 a liquid crystal cell layer 10 for convenience.

In close observation it can be seen that the liquid crystal cell layer 10 comprises a liquid crystal injection path 11 and a buffer part 12, in addition to the wall structure 3 and display part 4. The liquid crystal injection path 11 is a passage equipped for injecting liquid crystals into the display part 4 (i.e., the liquid crystal cell), and therefore the path 11 is on the left side of the first stage segment block 4a and between the adjacent segment blocks 4a. The liquid crystal injection path 11 is configured to be straight. The liquid crystals for the liquid crystal cell layer 10 are injected from the left end part 11a of the liquid crystal injection path 11 connecting to the left end of the first stage segment block 4a. The injected liquid crystals are injected into the last stage segment block 4a after being led through the liquid crystal injection path 11 and segment blocks 4a. The buffer part 12 connected to the right end of the last stage segment block 4a is equipped for encapsulating an extraneous volume of air flowing in when vacuum-injecting the liquid crystals. As a result, the liquid crystals are also filled in the buffer part 12 in terms of this structure.

The upper part of the wall structure 3 is equipped with the light shield mask (i.e., a light shield film) 5 which is a mask, being formed on the segment board 1, for preventing liquid crystal injection zones (i.e., the liquid crystal injection path 11 and buffer part 12), which are not required for a segment display in the liquid crystal cell layer 10, from functioning as display zones. The light shield mask 5 comprises light transmission parts 5a of a form corresponding to the segment pattern of the display part 4. The width of the light transmission part 5a is configured to be smaller than that of the segment block 4a of the display part 4, considering positioning margin and visibility. The light shielding function of the light shield mask 5 enables the display part 4 to display a segment with good visibility and contrast.

FIG. 4 is a horizontal cross-sectional diagram of a liquid crystal layer of the liquid crystal display apparatus proposed by patent document 4. Referring to FIG. 4, the whitened parts are the display parts (i.e., segments) 20 corresponding to the parts equipped with liquid crystal cells, or liquid crystal injection paths 28. Patent document 4 expresses each segment as a display part (or a liquid crystal cell). The liquid crystal injection paths 28 are indicated by six parallel thin lines, while the display parts 20 are indicated by rectangles or approximate rectangles that are thicker than the thin lines. The left end of the liquid crystal injection paths 28 is configured as a liquid crystal injection part 29. The display parts 20 are injected with an antiferroelectric liquid crystal by way of the liquid crystal injection part 29 and liquid crystal injection paths 28. The blackened parts are partition walls 27.

As described above, the LCD elements according to patent documents 3 and 4 are configured to be similar to each other; the main difference between the two is the use of different liquid crystal materials. The LCD element according to patent document 3 uses a cholesteric liquid crystal while the LCD apparatus according to patent document 4 uses an antiferroelectric liquid crystal.

Both the LCD element according to patent document 3 and the LCD apparatus according to patent document 4 are faced with the problem of display states being changed by finger pressure being applied onto the display surface or warping of the element (or the apparatus).

SUMMARY OF THE INVENTION

A first purpose of the present invention is to provide a cholesteric liquid crystal display (LCD) element capable of preventing changes in display states even if the display surface is pressed with a finger or pen. A second purpose of the present invention is to provide a cholesteric LCD element capable of preventing a change in display states even if the element is warped or twisted.

A first aspect of a liquid crystal display (LCD) element according to the present invention employs a cholesteric liquid crystal that comprises opposing substrates, a wall structure equipped between the substrates, a plurality of segment blocks constituted by a plurality of segments of which the sides are surrounded by the wall structure, and a liquid crystal injection path whose sides are surrounded by the wall structure connected between the segment blocks; the liquid crystal injection path is characterized by comprising a plurality of segment blocks, each of which comprises one or more segments connected to only one liquid crystal injection path for liquid crystals.

As described above, the comprisal of one or more segments having no outlet hole for liquid crystals in each segment makes it possible to improve durability against an externally given uniformly distributed load and to prevent changes in display states when a finger or other object presses the display surface.

In a second aspect of an LCD element of the present invention, the segment is internally equipped with a pillar for supporting said opposite substrates.

As described above, the equipping of the inside of the segment with a pillar makes it possible to improve the durability of the segment against an externally given concentrated load, and accordingly to prevent a change in the display even when a sharp body, such as a pen tip or finger nail, presses the display surface.

A third aspect of a liquid crystal display (LCD) element according to the present invention employs a cholesteric liquid crystal that comprises opposite substrates, a wall structure equipped between the substrates, a plurality of segment blocks constituted by a plurality of segments whose sides are surrounded by the wall structure; the segment blocks are not connected to each other.

As described above, the segments are not connected to each other by way of a liquid crystal flow path, and therefore it is possible to further improve the durability of the display element against an externally given uniformly distributed load as compared to the LCD element according to the above described first aspect.

In a fourth aspect of an LCD element of the present invention, the segment is internally equipped with a pillar for supporting said opposite substrates.

As described above, the equipping of the inside of the segment with a pillar makes it possible to improve the durability of the segment against an externally given concentrated load, and accordingly to prevent a change in the display even when a concentrated load is given to a part of the display surface.

BRIEF DESCRIPTION OF THE DRAWINGS

FIG. 12 is a diagram showing the deformation of a segment when a concentrated load is applied thereto.

FIG. 17 is a horizontal cross-sectional diagram of a segment in an LCD element according to a sixth embodiment.

DESCRIPTION OF THE PREFERRED EMBODIMENTS

The present applicant has, via experiments, investigated a mechanism of a display state of a cholesteric LCD element, as shown in patent document 3, being changed by a pressing pressure. The description here is of the mechanism and refers to FIGS. 5 and 6.

Figure 5:
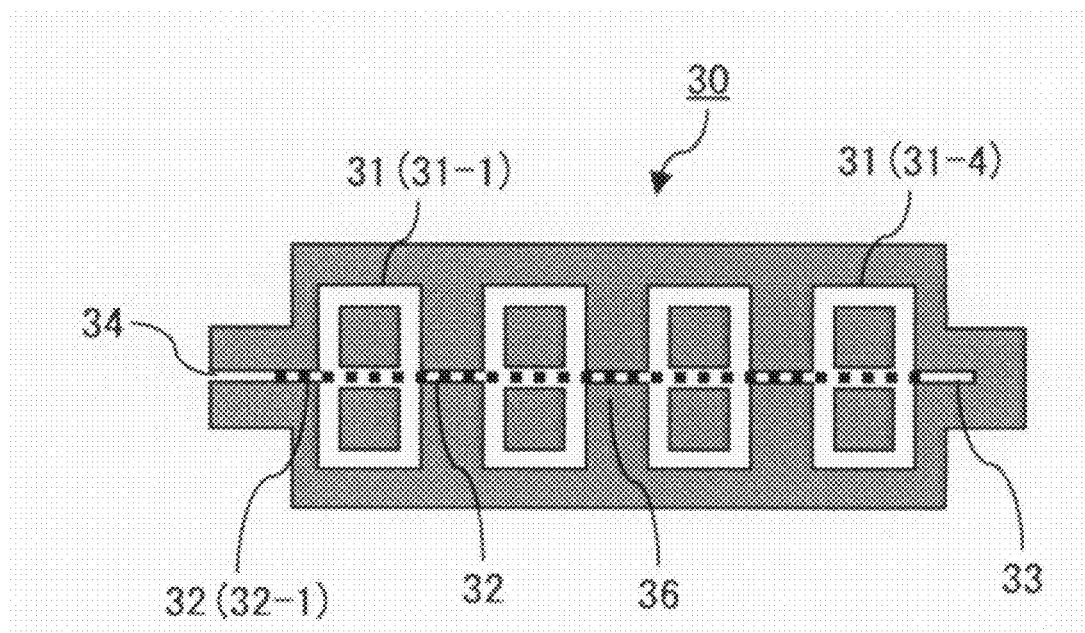
FIG. 5 is a diagram showing a changed part of a display state caused by pressing a conventional liquid crystal cell layer.
Figure 6:
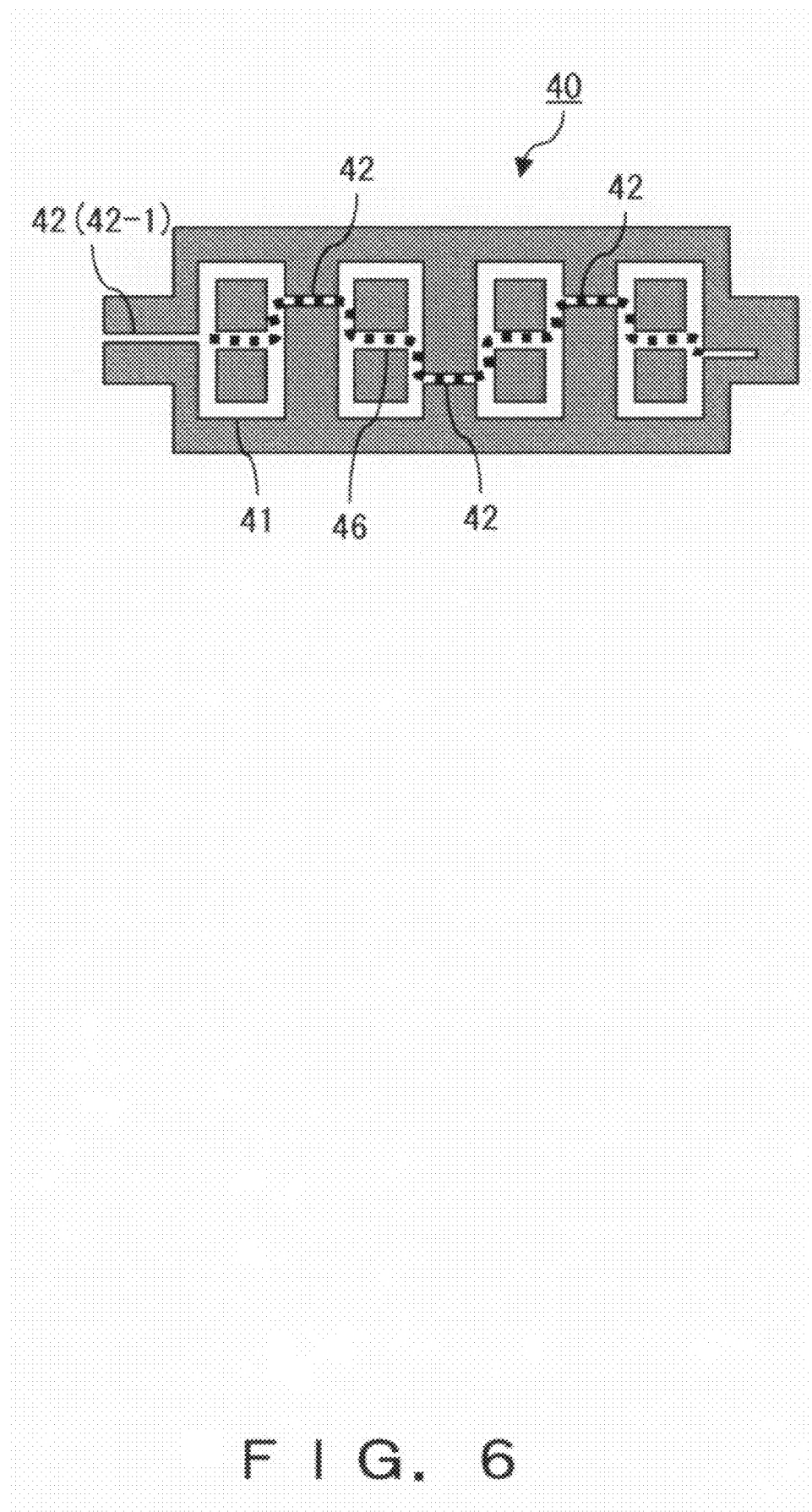
FIG. 6 is a diagram showing a changed part of a display state caused by pressing a conventional liquid crystal cell layer of another structure.

FIGS. 5 and 6 are each diagrams showing a top view of a wall structure, with the wall structure shown in FIG. 5 being different from the one shown in FIG. 6.

The wall structure 30 shown in FIG. 5 has four segments 31 as arranged in the shape of the character "8" being connected by way of a straight liquid crystal injection path 32. The first segment 31 (i.e., 31-1) is connected to the liquid crystal injection path 32 (i.e., 32-1) at the center of the left end, with the left end of the liquid crystal injection path 32-1 constituting a liquid crystal injection hole 34. The last segment 31 (i.e., 31-4) is connected to a straight air fill part 33 at the center of the right end.

A wall structure 40 shown in FIG. 6 has four segments 41 connected by way of a liquid crystal injection path 42 in a zigzag arrangement. The first stage and second stage segments 41 are mutually connected at the center part of their upper halves, the second and third segments are connected at the center part of their lower halves, and the third and fourth at the center part of their upper halves.

Experiment 1

The present applicant has made a cholesterol LCD element (not shown herein) with a film substrate by injecting cholesterol liquid crystal from the liquid crystal injection path 32-1 into the wall structure 30 shown in FIG. 5. Pressing the display surface of the cholesterol LCD element changes display states easily in the part indicated by the dotted line pattern 36 of FIG. 5. Also, causing warpage of the cholesteric LCD element by bending it in the longitudinal direction changes the display states easily in the part indicated by the dotted line pattern 36 in the same manner as pressing it with a finger.

Experiment 2

We have made a cholesteric LCD element (not shown herein) with a film substrate by injecting a cholesteric liquid crystal from the liquid crystal injection path 42 (i.e., 42-1) into the wall structure 40 shown in FIG. 6. Pressing the display surface of the cholesteric LCD element changes the display states easily in the part indicated by the dotted line pattern 46 of FIG. 6. Also, causing warpage of the cholesteric LCD element by bending it in the longitudinal direction also changes the display states in the part indicated by the dotted line pattern 46 although the change in the display states is more gradual as compared to the case of pressing it with a finger.

A known fact of cholesteric liquid crystals is that they are liquid crystals in which each crystal molecule has a spiral phase and the liquid crystals possess bistability in two kinds of states, i.e., a planar state reflecting the light of a specific wavelength (i.e., selective reflection) and a focal conic state that is transparent depending on the orientation of the spiral structure.

In the planar state, the axis of the spiral is vertical to the substrate surface and the liquid crystal molecules are parallelly lined up. In the focal conic state, the axis of the spiral is parallel with the substrate surface and the crystal molecules form a micro-domain. The cholesteric LCD element display the screen by utilizing these two states.

The changes in display states due to a pressure applied to the display surface and warpage of the element that have been found by experiments 1 and 2 above are caused by the cholesteric liquid crystal changing from the focal conic state to the planar state. This is conceivably caused by the liquid crystals within a segment (sometimes called a "liquid crystal cell" hereinafter) being moved, the liquid crystal molecules being dragged toward a boundary of the substrate, and the liquid crystal molecules being lined up parallelly with the substrate and being changed to a planar state. Referring to FIGS. 5 and 6, the changing positions of the display states indicated by dotted line patterns are places in which the liquid crystals are easily moved structurally by a pressure change within the liquid crystal cell. Also, a comparison between the cases of the thickness of the liquid crystal cell (i.e., cell gap) being 3 micrometers and 5 micrometers shows that the change in the display states is significant when the cell gap is 3 micrometers; that is, in the thinner case. This is conceivably because it is that quantity of the liquid crystals close to the boundary of the substrate is relatively large in the case of 3 micrometers, and therefore it is more prone to being affected by the boundary of the substrate.

Considering the situation described above, the present applicant has ascertained that the formation of a wall structure so as to suppress the fluidity of the liquid crystals within a liquid crystal cell makes it possible to prevent a change in the display states resulting from pressure on or bending of the display surface of the LCD element.

There are two kinds of loads applied to an LCD element when pressing the display surface, a "uniformly distributed load" and a "concentrated load". A uniformly distributed load is a load generated when pressing with an object of a relatively large area such as a finger, distributing the load relatively uniformly around the pressed part. A concentrated load is one generated when pressing with an object of a small area such as the tip of a ballpoint pen or a fingernail, concentrating the load on the pressed part instead of being spread within the surrounding area.

Described below are embodiments for dealing with a change in display state resulting from a uniformly distributed load and an embodiment for dealing with a change in display state resulting from a concentrated load.

Figure 1:
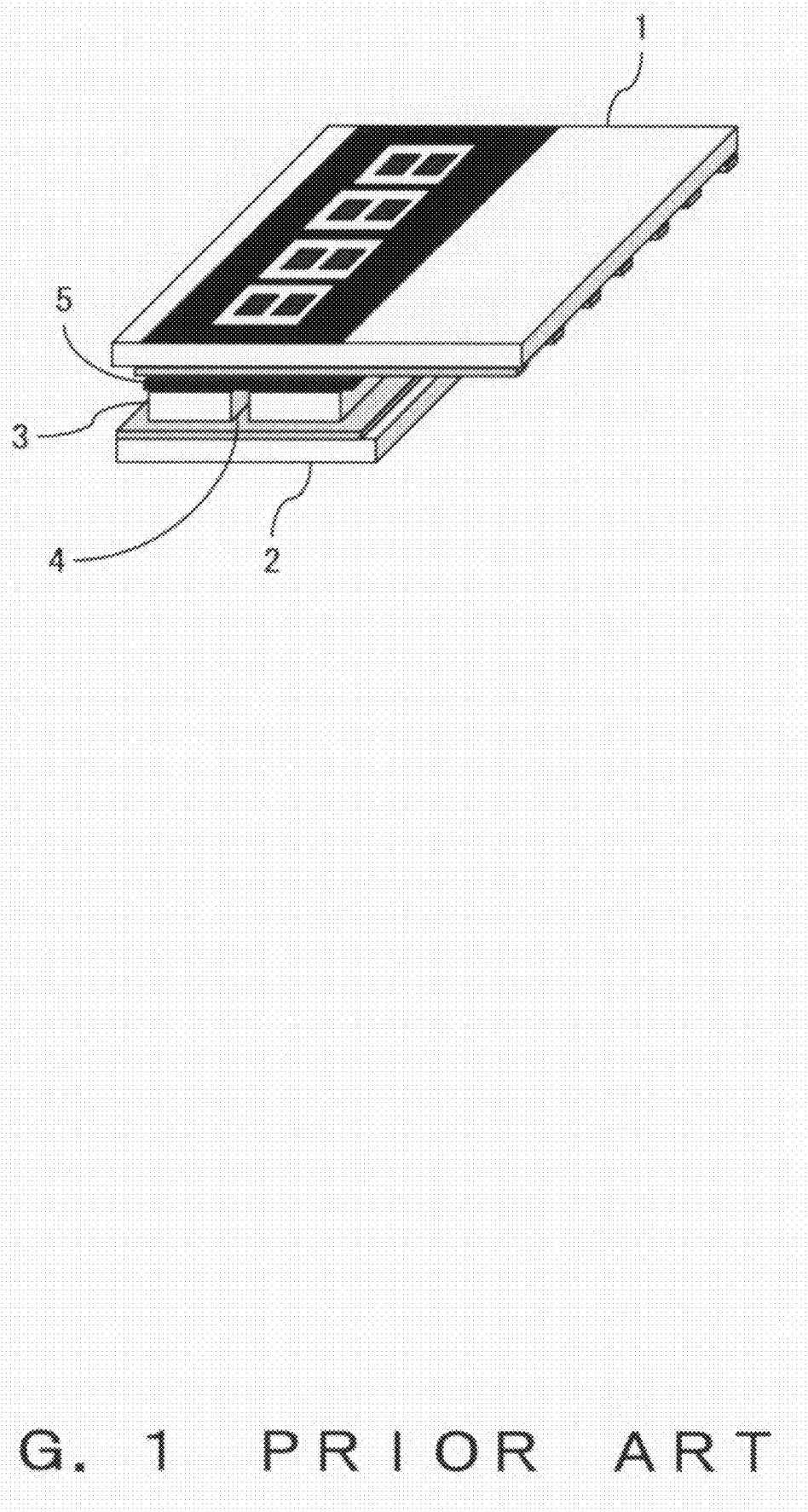
FIG. 1 is a diagram showing an overall structure of a conventional cholesteric LCD element.
Figure 2:
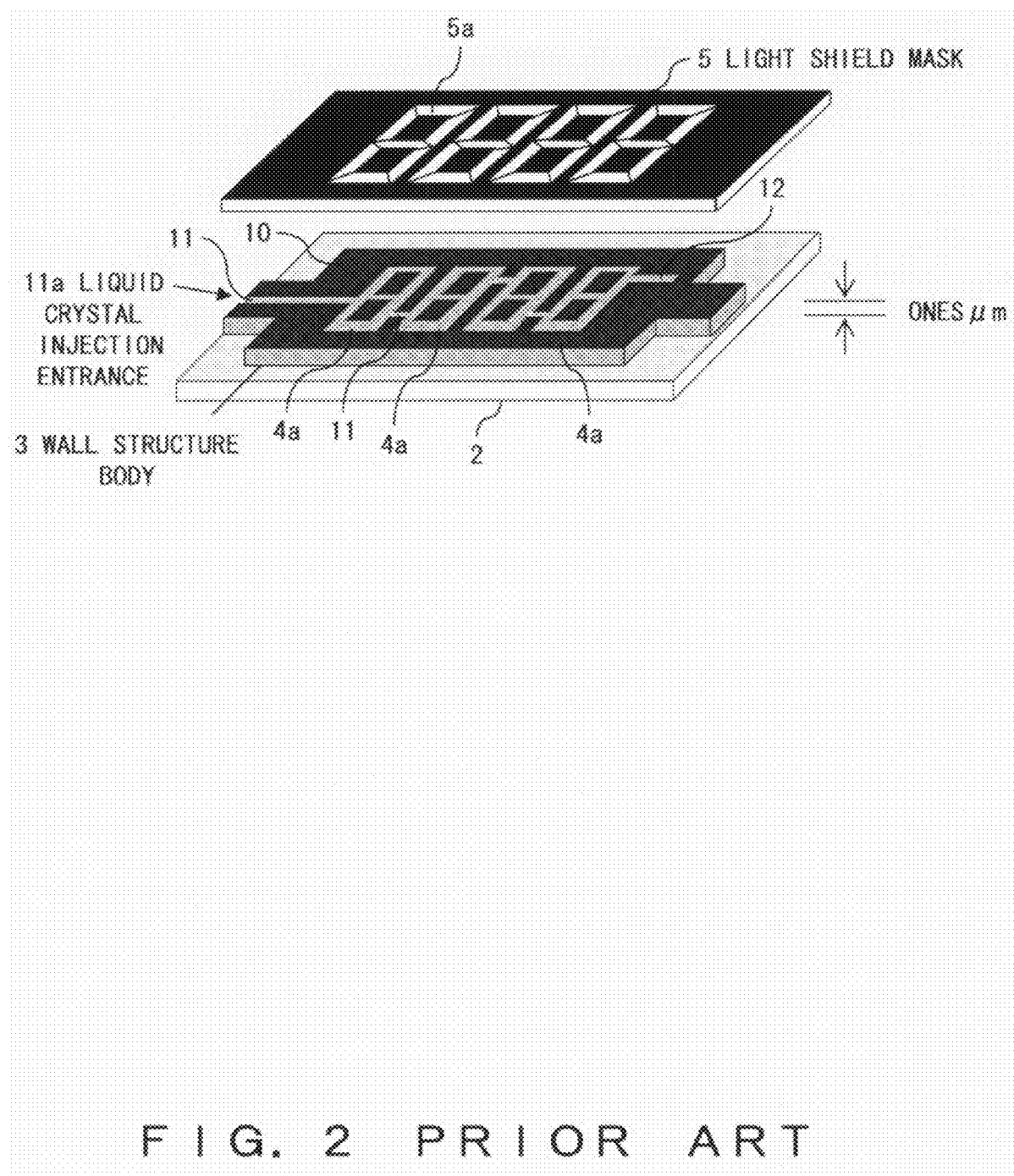
FIG. 2 is an exploded diagram showing a main part of the conventional cholesteric LCD element.
Figure 3:
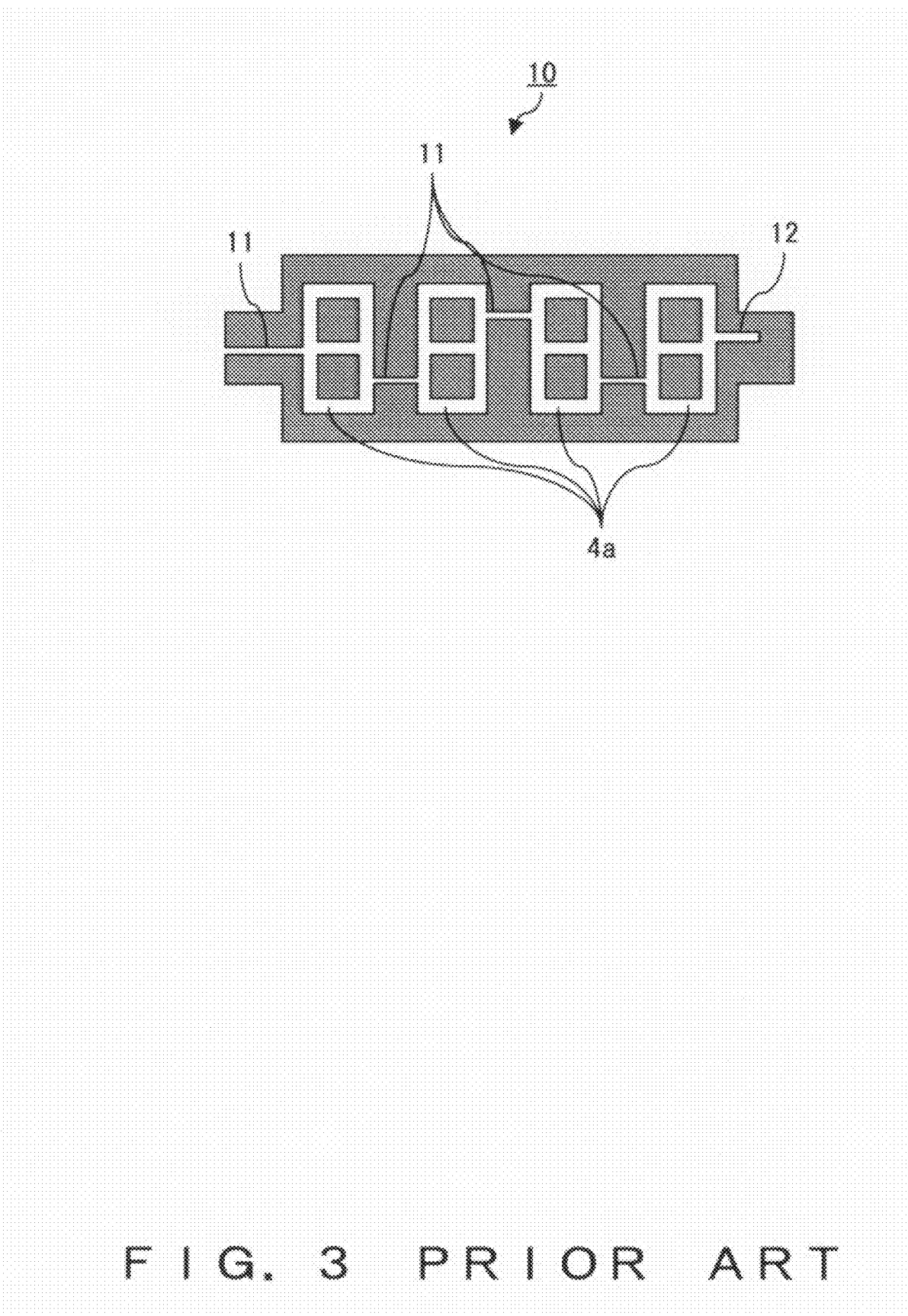
FIG. 3 is a horizontal cross-sectional diagram of a liquid crystal cell layer in the conventional cholesteric LCD element.
Figure 4:
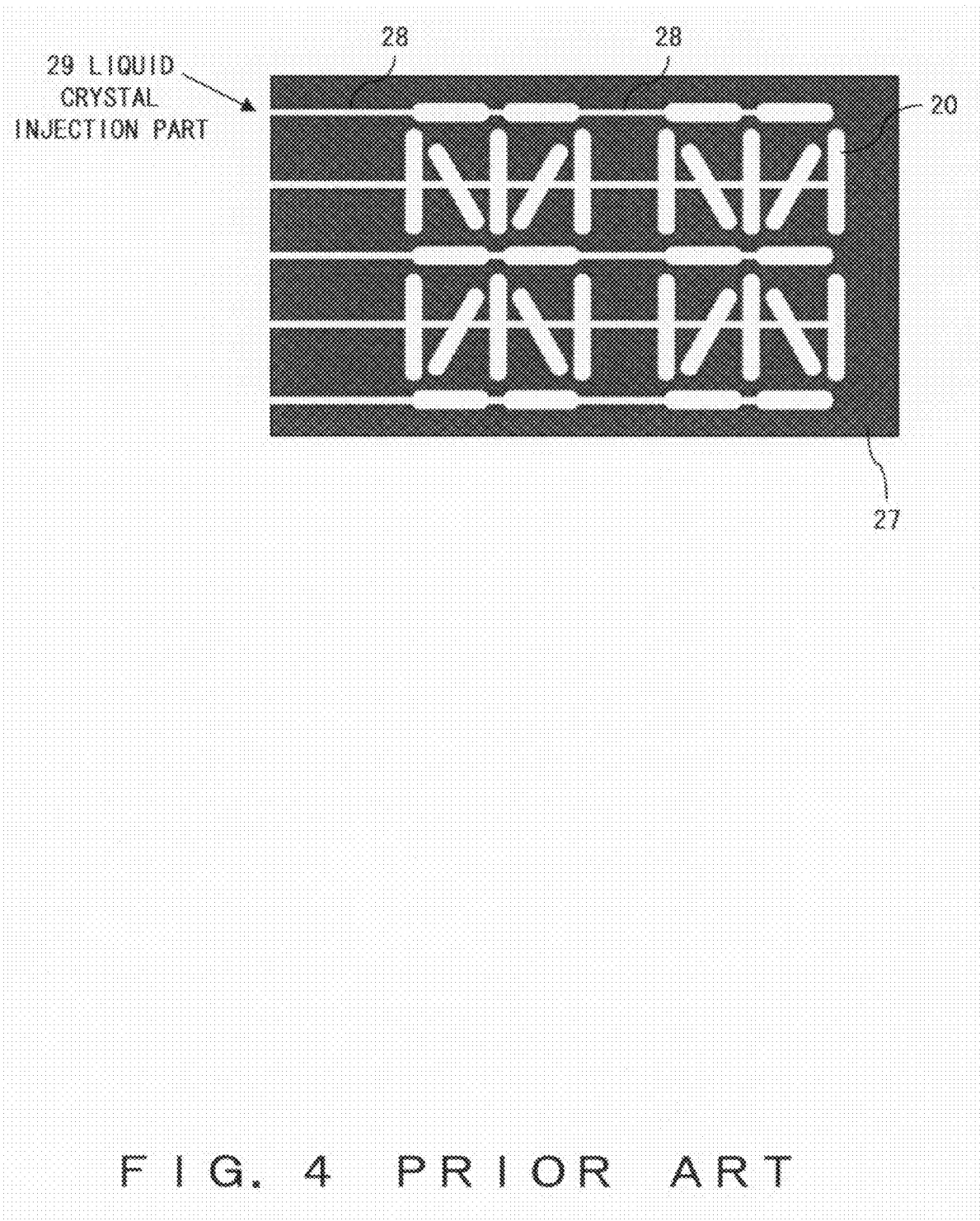
FIG. 4 is a horizontal cross-sectional diagram of a liquid crystal cell layer in a conventional antiferroelectric LCD element.

Both embodiments have a similar overall comprisal (i.e., the layout of individual constituent components) to the LCD element proposed by patent document 3 shown in FIGS. 1, 2 and 3. The fundamental difference between the former and latter lies in the structures of liquid crystal cell layers. The present invention contrives the structure of a wall structure (i.e., a display part and a pattern feature of a liquid crystal injection path) and that of the interior of a segment (i.e., within a liquid crystal cell) in the wall structure, thereby increasing the strength against a uniformly distributed load and a concentrated load as compared to the conventional LCD element.

Figure 7:
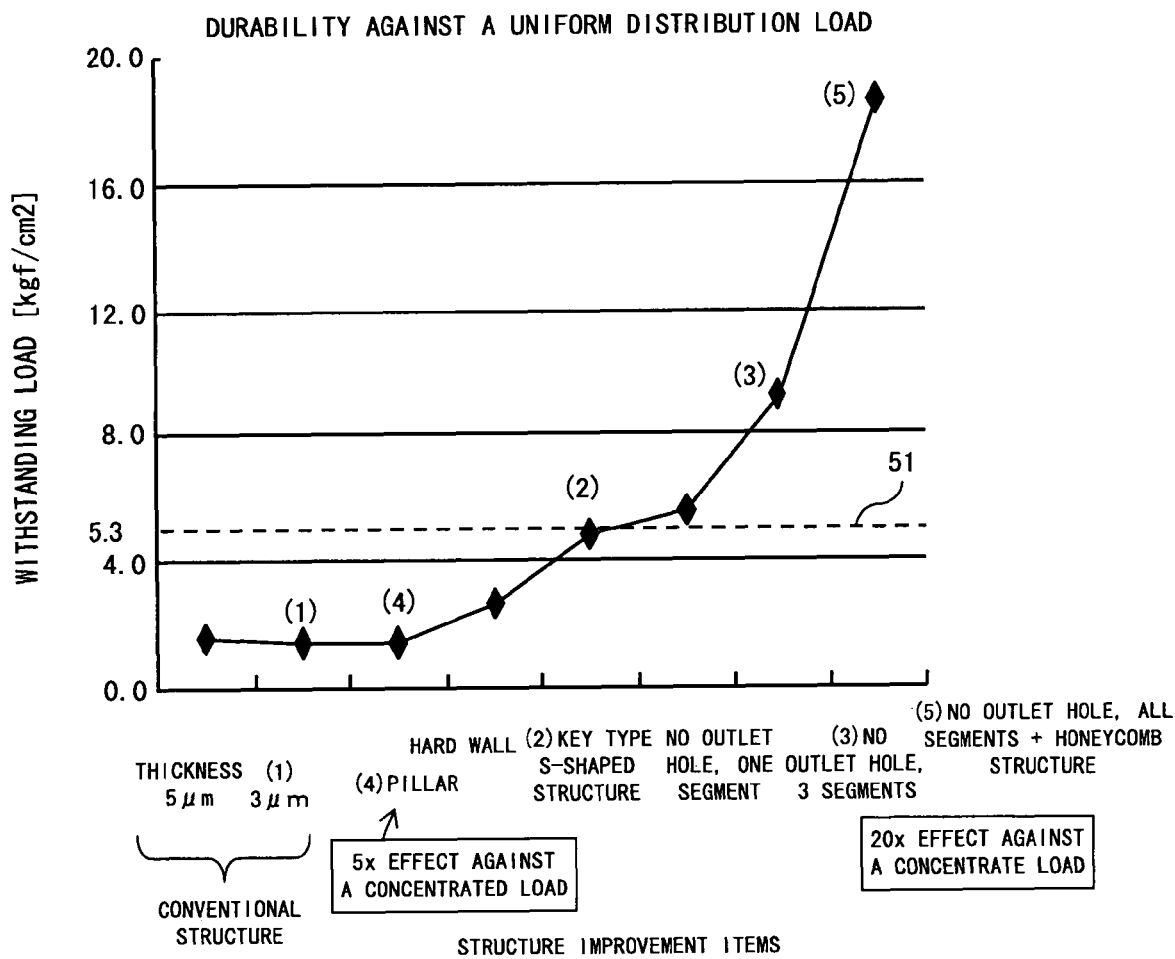
FIG. 7 is a diagram showing an effect on withstand load in an LCD element according to each respective embodiment of the present invention.

FIG. 7 is a graph showing an effect on withstand load in an LCD element according to each of the preferred embodiments of the present invention.

This graph shows display changes resulting from a "uniformly-distributed load" applied to the display surface as in the case of a finger pressing the display surface of an LCD element, with the horizontal axis indicating the conventional LCD elements and the individual LCD elements according to respective embodiments of the present invention and the vertical axis indicating their respective withstand load capability (in kg/cm2), i.e., the applied maximum finger pressing pressure (noted as "finger pressure" hereinafter) before the display of an LCD element changes when a finger presses the display surface of the LCD element.

The horizontal dotted line 51 shown in the graph indicates the minimum target value, i.e., 5.3 kgf/cm2, of the withstand load capability when an LCD element is incorporated as a display element of an IC card. The target value is a statically derived value that comes from the measurement results of an experiment involving the finger pressures of approximately 10 peoples, and therefore it can be regarded as an average finger pressure.

For the conventionally structured LCD element having the liquid crystal cell shown in FIG. 3, the withstand load capability when the thickness of the cholesteric liquid crystal ("liquid crystal" hereinafter) is 5 µm is 1.6 kgf/cm$^2$. When the thickness of the liquid crystals is reduced to 3 µm, the withstand load capability decreases to 1.3 kgf/cm$^2$. As such, the conventionally structured LCD element can never bear finger pressure.

One cause of display change in an LCD element is the internal outflow of a cholesteric liquid crystal caused by a deformation of the liquid crystal cell, and this results in an increased hardness of the wall structure that increases the deformation strength of the liquid crystal cell against finger pressure and makes it possible to prevent changes in the display changes that would result from finger pressure. The present applicant has accordingly reinvestigated a material for the wall structure, resulting in the selection of a harder material for a post-adhesion hardened wall structure. Since the wall structure is a polymer, it tends to increase with molecular weight and crosslink density. Application of this method to the conventionally structured LCD element with a 3 µm-thick liquid crystal turns the wall structure into a hard wall structure and increases the withstand load capability to 2.7 kgf/cm$^2$.

As described above, the withstand load capability of the conventionally structured LCD element cannot meet the target value even with an increase in the hardness of the wall structure that is made of a polymer. The preferred embodiment of the present invention has contrived to be capable of suppressing the flow of liquid crystals within the liquid crystal cell by means of changing the pattern of the wall structure from the conventional configuration. The "configurations of a liquid crystal injection path" and "structure of each segment of a segment block" are focused upon.

The embodiments described below are applications of the present invention to an LCD element, of which the number display part (noted as "segment block" hereinafter) of each digit of the display part is constituted of seven segments.

Embodiment 1

Figure 8:
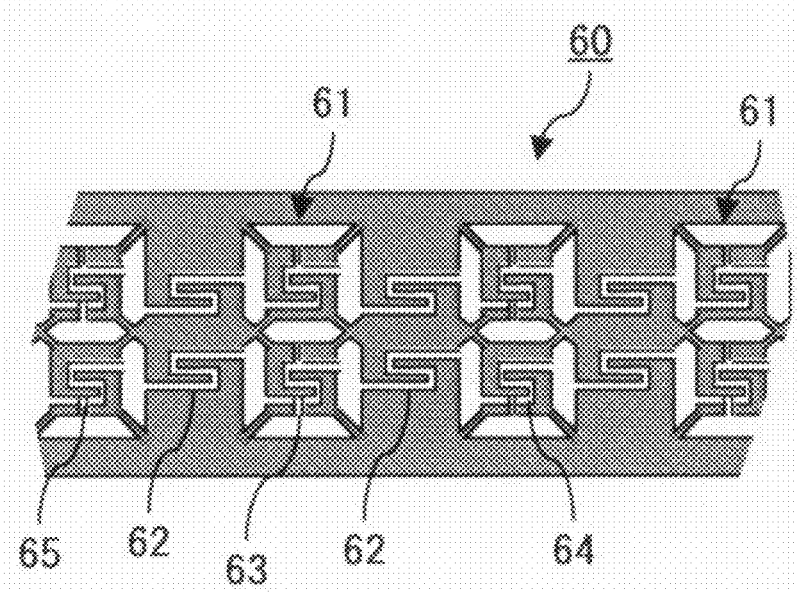
FIG. 8 is a horizontal cross-sectional diagram of a liquid crystal cell layer in an LCD element according to a first embodiment.

FIG. 8 is a partial horizontal cross-sectional diagram of a liquid crystal cell layer in an LCD element according to first embodiment of the present invention.

A load that occurs when a finger presses the display surface of an LCD element is called a uniformly distributed load. In a liquid crystal 60 according to first embodiment, the "configurations of a liquid crystal injection path" are focused on via the magnitude of the uniformly distributed load and accordingly a liquid crystal injection path 62 connecting segment blocks 61 is configured as a key-type S-shaped structure. Also, within the segment block 61, two pairs of left segments 63 and two pairs of right segments 63, each of the two pairs are respectively located on the opposite upper and lower sides, are mutually connected by way of liquid crystal injection paths 64, each of which has a key-type S-shaped structure. Additionally each of the segments 63 located at the upper, middle and lower parts are connected to the liquid crystal injection paths 64 by way of linearly structured liquid crystal injection paths 65 that are vertically branched respectively from the liquid crystal injection paths 64. As such, the liquid crystal injection paths 62 and 64 are configured to have a structure taking advantage of the fact that certain fluids do not flow through corners easily. Therefore, the liquid crystal injection path 64 may be configured in any structures provided there is a corner in the passage, but not limited to the key-type S-shaped structure.

As shown in FIG. 3, the conventional LCD element has a segment block 4a which is not divided into a plurality of segments, whereas the present embodiment, focusing on "segment structure", is configured to divide the segment block 61 into seven segments 63 and also to singularize a liquid crystal injection inlet (noted as "injection inlet" hereinafter) for each segment 63. Such a structure increases the number of segments 63 not having a liquid crystal outlet hole (noted as "outlet hole" hereinafter). These segments 63 have no outlet holes and therefore the fluidity of the liquid crystals inside of the segments decreases. The LCD element according to first embodiment comprises the upper, middle and lower segments 63 that only have an injection inlet and not having an outlet hole. In other words, each of these three segments 63 is configured to be connected to only the liquid crystal injection path 64 constituting an injection inlet, and not connected to a liquid crystal injection path 64 constituting an outlet hole.

FIG. 7 shows an effect of increasing the withstand load capability for the LCD element configured as described above according to embodiment 1.

As indicated by the diamond assigned the (3) in FIG. 7, the withstand load capability of the LCD element of embodiment 1 has increased to 9.33 kgf/cm$^2$. Although a structure diagram is not shown herein, the withstand load capability of an LCD element in which each segment block has only one segment that does not have an outlet hole is 5.6 kgf/cm$^2$. This has revealed that the withstand load capability changes with the number of segments that do not have an outlet hole.

Figure 9:
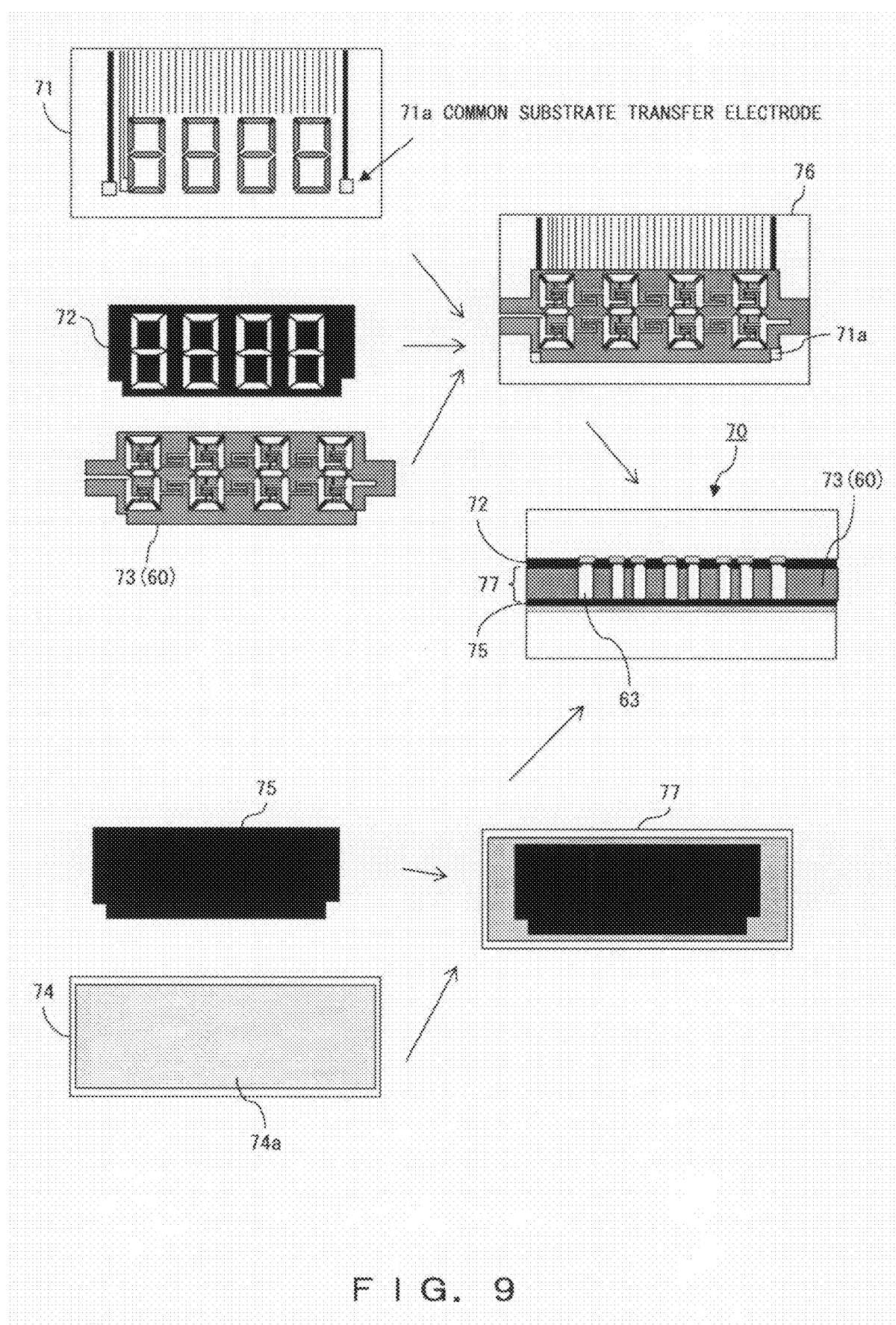
FIG. 9 is a diagram showing a production process of an LCD element according to the first embodiment.

FIG. 9 is a diagram showing a production process of an LCD element according to the first embodiment.

The production process of the LCD element according to the first embodiment is approximately the same as the production process according to patent document 3, except for the forming process of the liquid crystal layer (i.e., the forming process of the wall structure). Therefore, a simple description is provided herein:

(1) First, a light shield mask (i.e., a light shield film) 72 of the segment pattern is formed on the surface of a film substrate (i.e., a segment substrate) 71 on which a transparent electrode of the segment pattern is featured.

(2) Next, a wall structure 73 having an adhesive property is formed; this constitutes the liquid crystal layer considering the liquid crystal injection path on the light shield mask 72.

(3) Next, a light absorption layer 75 is formed on a common half, and at the upper and lower parts of the right end) have no outlet holes, while all of the segments of the other segment blocks have injection inlets and outlet holes. Therefore, even when using the LCD apparatus for the cholesteric liquid crystals, an effect of reduced mobility in the liquid crystals on the inside of the segments (i.e., an improvement in the withstand load capability in other words) when pressing pressure is applied to the display surface cannot be expected.

Thus, while a structure exceeding the target value of withstand load capability is achieved by means of the LCD element according to the first embodiment, the convenience of an IC card further improves with improvements in the withstand load capability, however. That is, it is desirable for a display of the IC card to not change regardless of the usage condition. Accordingly, an LCD element having a liquid crystal cell of a wall structure in which each segment within each segment block has one injection hole, as described below, is contrived by further developing the structure of the first embodiment.

Embodiment 2

Figure 10:
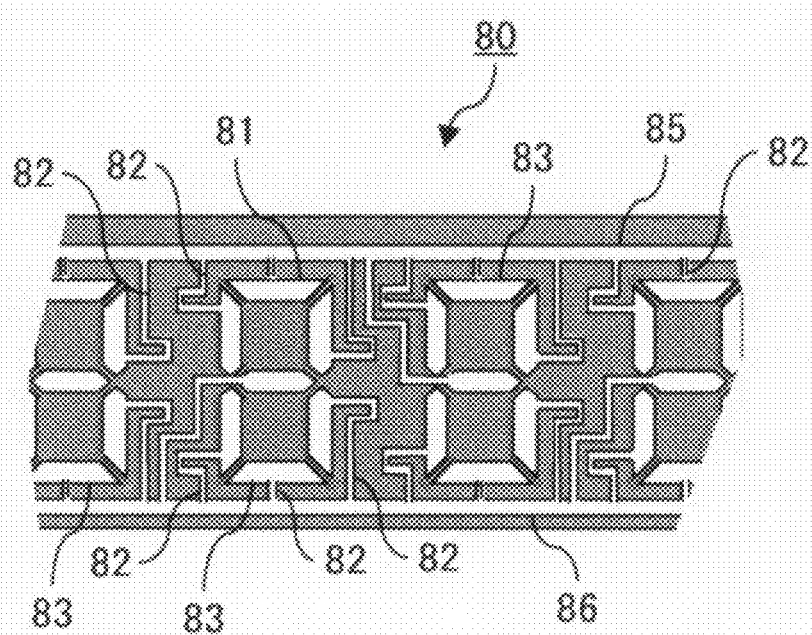
FIG. 10 is a horizontal cross-sectional diagram of a liquid crystal cell layer in an LCD element according to a second embodiment.

FIG. 10 is a partial horizontal cross-sectional diagram of a liquid crystal cell layer in an LCD element according to second embodiment of the present invention based on the above noted contrivance.

The liquid crystal cell layer 80 in the LCD element according to the second embodiment shown in FIG. 10 is equipped with straight line-formed common liquid crystal injection paths 85 and 86 respectively on the upper and lower sides of the column of segment blocks 81 and in parallel with the column of segment blocks 81 that are connected to one another in the horizontal direction. The structure is formed in such a manner so as to inject the liquid crystals into each segment 83 on the upper half of each segment block 81 by way of a liquid crystal injection path 82 that is branched from the common liquid crystal injection path 85, while it is formed in such a manner so as to inject the liquid crystals into each segment 83 on the lower half by way of a liquid crystal injection path 82 branched from the common liquid crystal injection path 86. The liquid crystal injection path 82 is formed as a straight line, roughly in a dipper shape, or stepwise, with the latter two liquid crystal injection paths 82 being respectively formed to have a corner part.

Because it is structured as such, each segment 83 within each segment block has only one injection inlet. Also, due to being structured in such a manner that all segment blocks 81 are connected by way of the common liquid crystal injection paths 85 and 86, none of the individual segments 83 has an outlet hole.

As described above, the LCD element according to the second embodiment is configured to have a structure in which all the segments 83 within the liquid crystal cell 80 have no outlet hole, thereby further improving the withstand load capability as compared to the LCD element according to the first embodiment.

Embodiment 3

Figure 11:
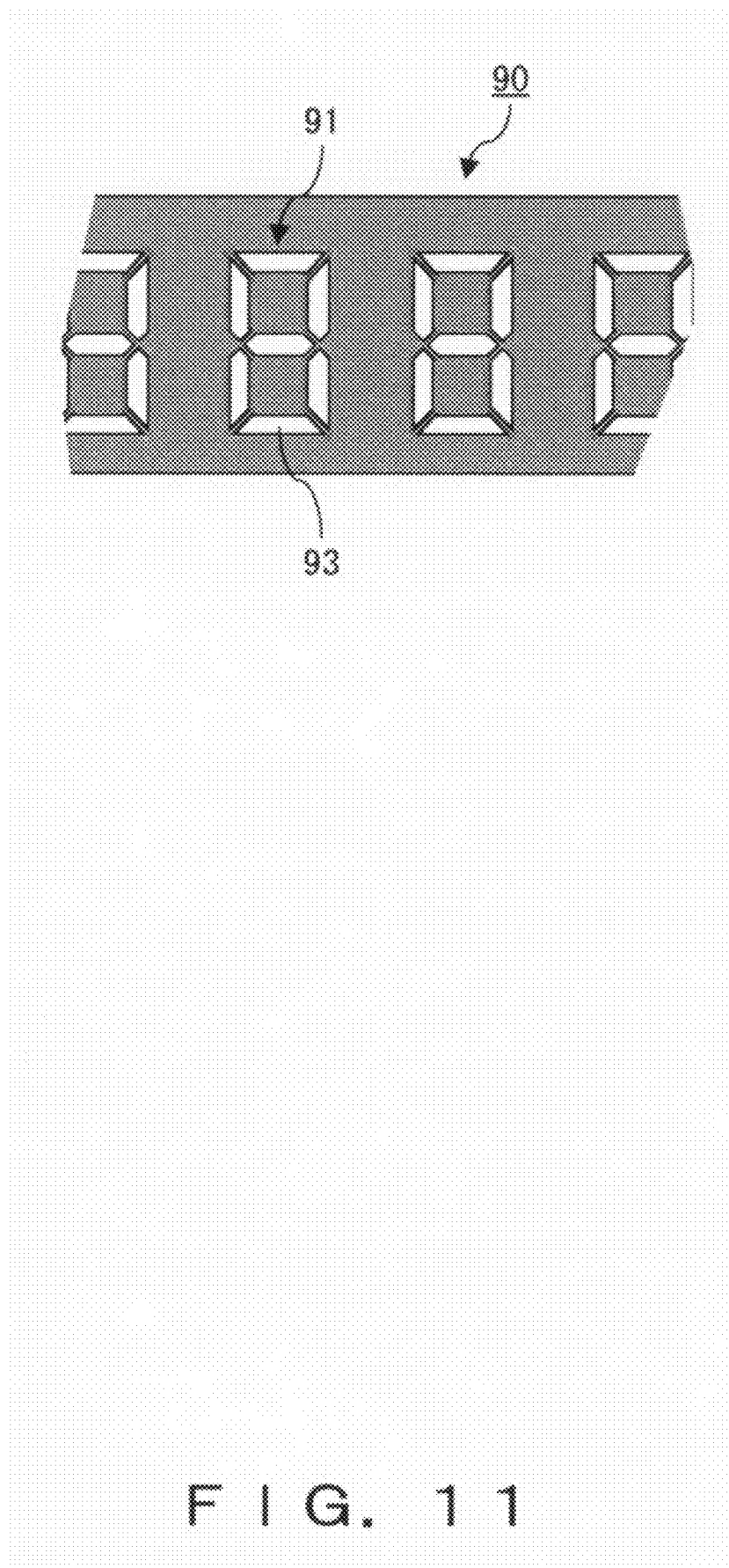
FIG. 11 is a horizontal cross-sectional diagram of a liquid crystal cell layer in an LCD element according to a third embodiment.

FIG. 11 is a partial horizontal cross-sectional diagram of a liquid crystal cell layer in an LCD element according to third embodiment of the present invention.

In the liquid crystal layer 90 of the LCD element according to the third embodiment as shown in FIG. 11, all segments 93 of all segment blocks 91 are independent, with these segments 93 having neither injection inlet nor outlet hole. Therefore, no liquid crystal injection path exists either. Due to this, the withstand load capability of the LCD element according to the third embodiment is further improved to be higher than that of the LCD element of the second embodiment.

The structure of the liquid crystal cell layer 90 of the LCD element according to the third embodiment cannot be produced by a vacuum injection method, which is a common production process for a liquid crystal panel. However, it is possible to produce this structure by the production process described below:

(1) Depress only the segment parts of the wall structure.
(2) Drop liquid crystals (i.e., cholesteric liquid crystals) into the depressed parts to fill them with liquid crystals.
(3) Laminate two substrates (i.e., a common substrate and a segment substrate).

There is a possibility that the liquid crystals will be mixed with air bubbles in the above described processes (2) and (3), and therefore it is preferable that the dropping of the liquid crystals and the lamination of the opposite substrates be carried out in a vacuum.

The above described LCD elements according to the first, second and third embodiments aim at improving the uniformly distributed withstand load capability generated by the pressing pressure of a finger or other such device applied to the display surface of the LCD element. In the case of IC cards, assumed situations include, in addition to a finger, the tip of a ballpoint pen or finger nail pressing the display part of the IC card. In such a case, a concentrated pressure is applied to the display part, causing a change in the liquid crystal display. In order to improve the convenience of the IC cards, the display changes resulting from the concentrated load must also be suppressed.

In the case of a concentrated load, pressure is concentrated on a small area, and therefore often only an individual segment has pressure applied to it. Since each segment is filled with liquid crystals, a concentrated load on a segment tends to move the liquid crystals within the segment easily. This propensity is especially significant in the case of a film substrate.

FIG. 12 is a diagram showing the deformation of a segment when a concentrated load is applied thereto.

Referring to FIG. 12, a segment 100 is structured as being sandwiched between a segment electrode 107 formed on a segment substrate 101 and an electrode (i.e., a common electrode) 104 opposite to it respectively from the top and bottom, and enclosed by wall structure bodies 103 having an adhesive property from the left and right sides. The top surfaces of the wall structure bodies 103 having an adhesive property are respectively equipped with light shield masks 102. The light shield masks 102 are sandwiched between the segment substrate 101 and wall structure bodies 103 having an adhesive property.

When a pressing pressure is applied to a part of the segment substrate 101, which is positioned in the upper central part of the segment 100, in the direction indicated by the arrow 108 in FIG. 12, the surrounding area around the center of the part of the segment substrate 101 being pressed upon is depressed in the pressing pressure direction, accompanied by the liquid crystals within the segment 100 being depressed by the segment electrode 107, resulting in deformation of the segment 100. The present applicant made a prototype of the conventionally structured segment 100 of the width of 0.4 mm and investigated its load withstanding capability against a concentrated load on the segment 100, and found that the withstand load capability of the segment 100 was 0.6 kgf/cm$^2$. As such, the conventionally structured segment 100 is very fragile against a concentrated load, a pressing pressure of a mere 0.6 kgf/cm$^2$ changing the display.

Accordingly contrived for improving withstand load capability against a concentrated load is the formation of a pillar having an adhesive property (i.e., an adhesive pillar) on the inside of a wall-structured segment. The adhesive pillar is configured to support opposite substrates and the wall structure surrounding the sides of a segment. Therefore it functions to alleviate pressing pressure applied to the liquid crystals on the inside of the segment.

Embodiment 4

Figure 13:
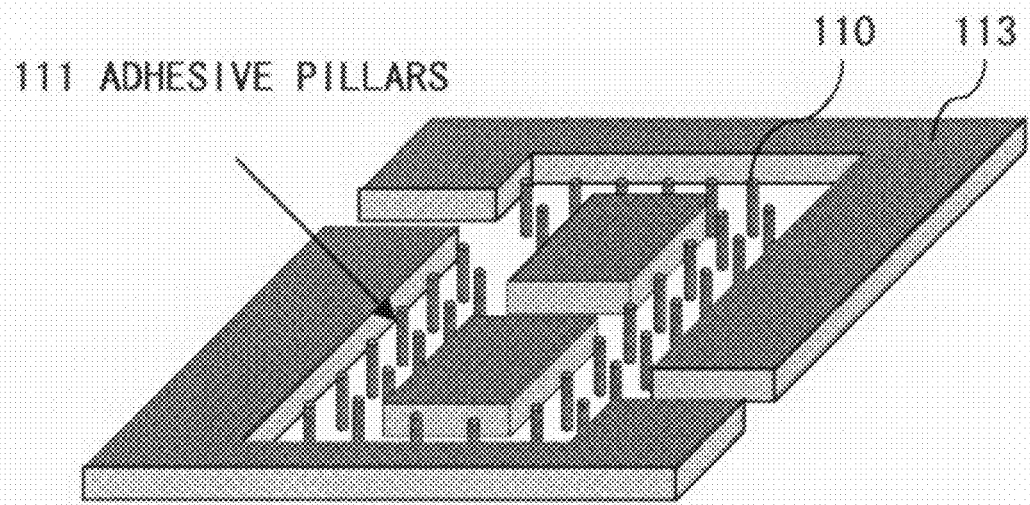
FIG. 13 is a solid perspective view showing a structure of a segment in an LCD element according to a fourth embodiment.
Figure 14:
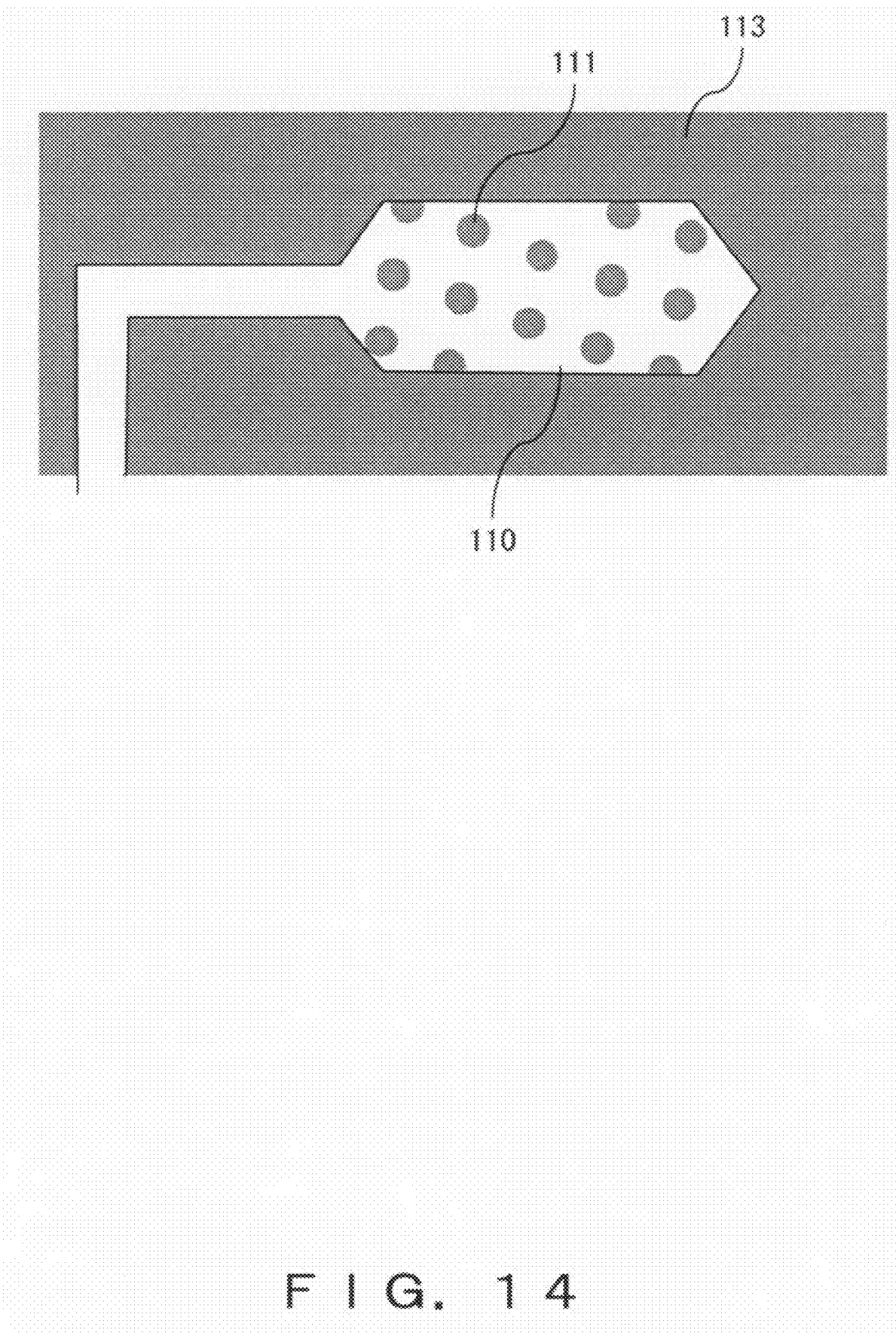
FIG. 14 is a horizontal cross-sectional diagram of a segment in an LCD element according to the fourth embodiment.

FIG. 13 is a diagonal outline view showing a structure of a segment in an LCD element according to fourth embodiment of the present invention based on the above-mentioned contrivance, and FIG. 14 is a plain view when looking at the segment from the display surface side.

As shown in FIGS. 13 and 14, a segment 110 of an LCD element according to the fourth embodiment comprises cylindrical column-shaped adhesive pillars ("pillars" hereinafter) 111 which are arrayed in rows at regular intervals.

Figure 15:
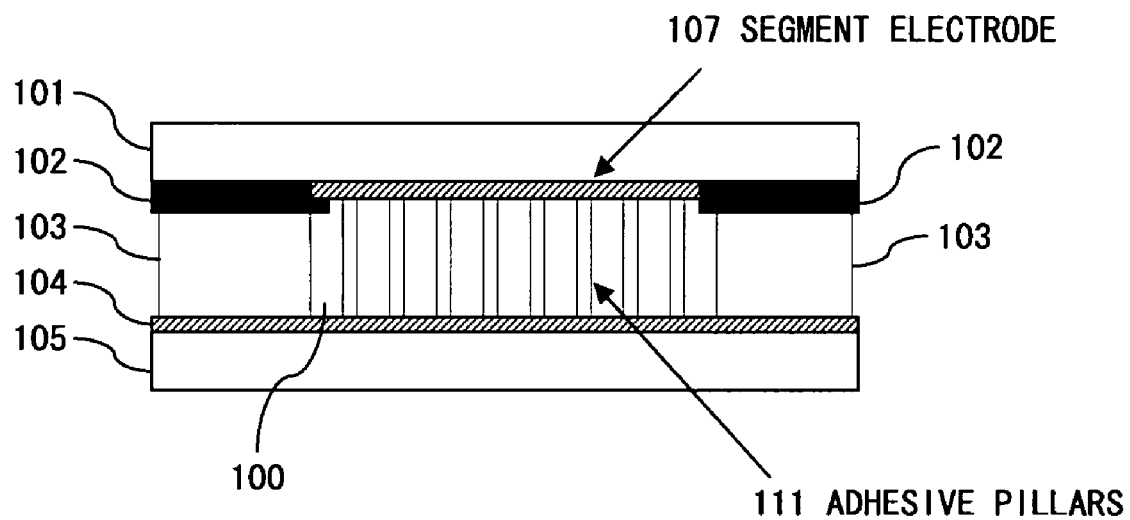
FIG. 15 is a vertical cross-sectional diagram of an LCD element according to the fourth embodiment 4.

FIG. 15 is a vertical cross-sectional diagram of the segment 110. In FIG. 15, the same component sign is attached to the same constituent component as in the conventionally structured segment 100 shown in FIG. 12.

Referring to FIG. 15, the pillars 111 are internally placed in the segment 110 at regular intervals. The equipment of the hard pillars 111 internally in the segment 100 suppresses the deformation of the segment 110 even if a concentrated load is applied thereto, thereby reinforcing the prevention of display changes against a concentrated load applied to the segment 110.

The present applicant actually formed the cylindrical pillars 111 of the diameter of 0.03 mm internally in the segment 100 in an array pattern as shown by FIG. 13, and found that the withstand load capability increases to a concentrated load of a 3.5 kgf/cm2, that is, an improvement of five and a half times, as indicated by the numeral (4) in the graph shown in FIG. 7.

The material of the pillars can use the same one as that of a wall structure 113, enabling a production by the same process as therefore. If the wall structure 113 is formed by lithography for example, a photo mask can be made by adding a pattern of the pillars to that of the wall structure 113.

Incidentally, the LCD element according to the fourth embodiment has the withstand load capability against a uniformly distributed load approximately the same as in the case of the conventionally structured LCD element, that is, the former has almost no effect on the withstand load capability against a uniformly distributed load. Accordingly contrived is a structure for improving a withstand load capability not only against a concentrated load but also against a uniformly distributed load.

Embodiment 5

Figure 16:
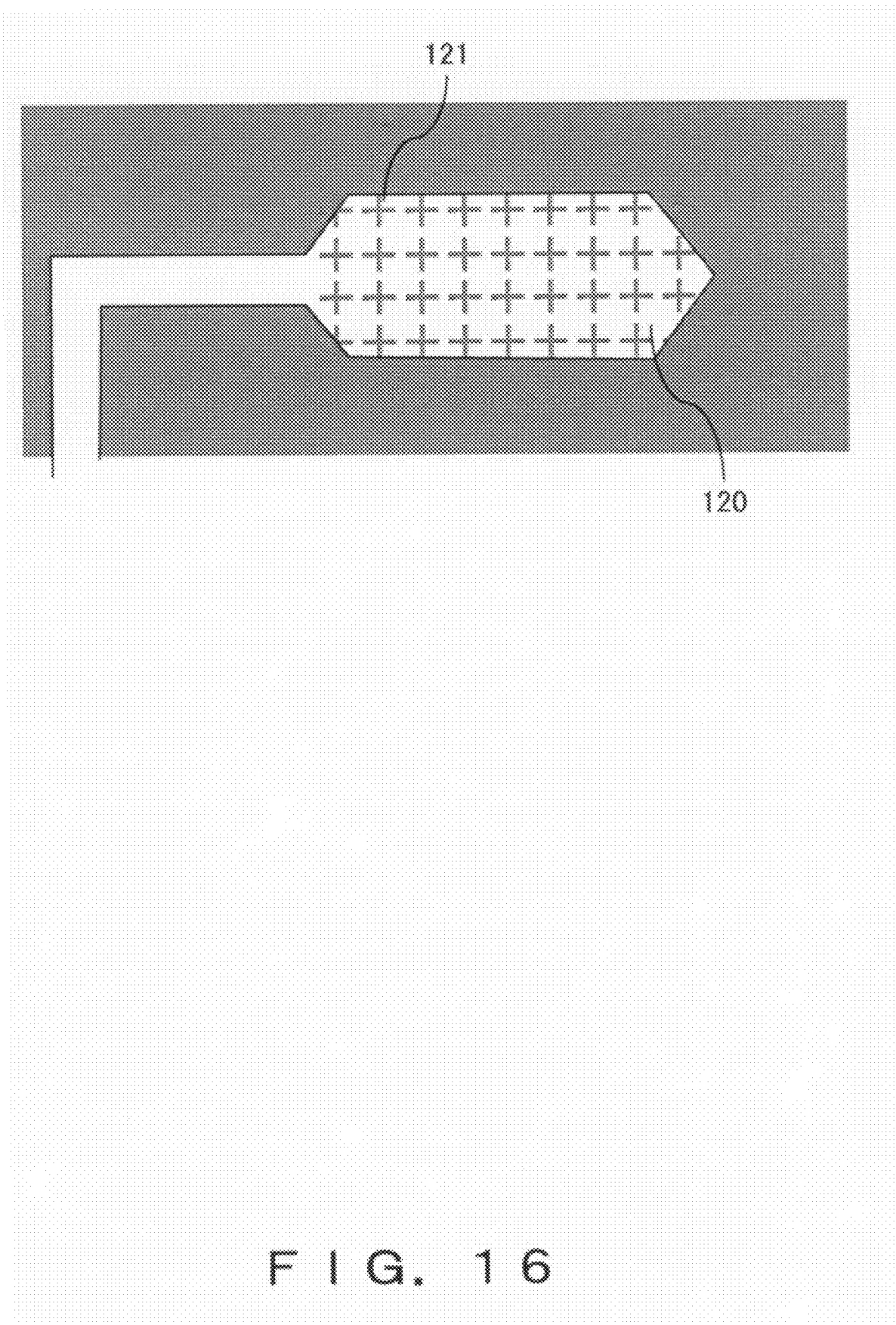
FIG. 16 is a horizontal cross-sectional diagram of a segment in an LCD element according to a fifth embodiment.

FIG. 16 is a horizontal cross-sectional diagram showing features and an array pattern of pillars within a segment in an LCD element according to fifth embodiment of the present invention.

The fifth Embodiment is configured to form the pillar 121 as a solid body a cross section of which is cross-shape and to array the pillars 121 in a grid pattern at even intervals within a segment 120. Because the cross-section of the pillar is configured in the shape of a cross, the flow path is limited to gaps between the crosses, and therefore the fluidity is greatly limited. Therefore, durability against a concentrated load and a uniformly distributed load is improved.

Embodiment 6

FIG. 17 is a horizontal cross-sectional diagram showing configurations and an array pattern of pillars in a segment in an LCD element according to sixth embodiment of the present invention.

Pillars 131 are formed in an approximately honeycomb structure on the inside of a segment 130. In the case of equipping such honeycomb-structured pillars 131, the durability is most improved against a concentrated load for the segment 130. The present honeycomb structure is characterized by equipping one side of the hexagon with an opening 133.

Embodiment 7

Although it is not shown in any of the drawings, the present applicant made an LCD elements having the approximate honeycomb structure and an LCD element not having an outlet hole in any segment, as shown in FIG. 10. As a result, the durability of the LCD element against a uniformly distributed load is 18.7 kgf/cm2, as shown in the numeral (5) of the graph of FIG. 7, i.e., more than 10 times the durability (=1.3 kgf/cm$^2$) of the conventionally structured LCD element. The LCD element also gained a durability of 12.7 kgf/cm$^2$ against a concentrated load, yielding an even greater increase, more than 20 times that of the conventional structure of the LCD element.

There are many openings as entrances for liquid crystals in the pillar structure of the segment in the LCD elements according to the sixth and seventh embodiments shown in FIGS. 16 and 17, respectively. However, at least two or more such openings for liquid crystals are sufficient.

Embodiment 8

Figure 18:
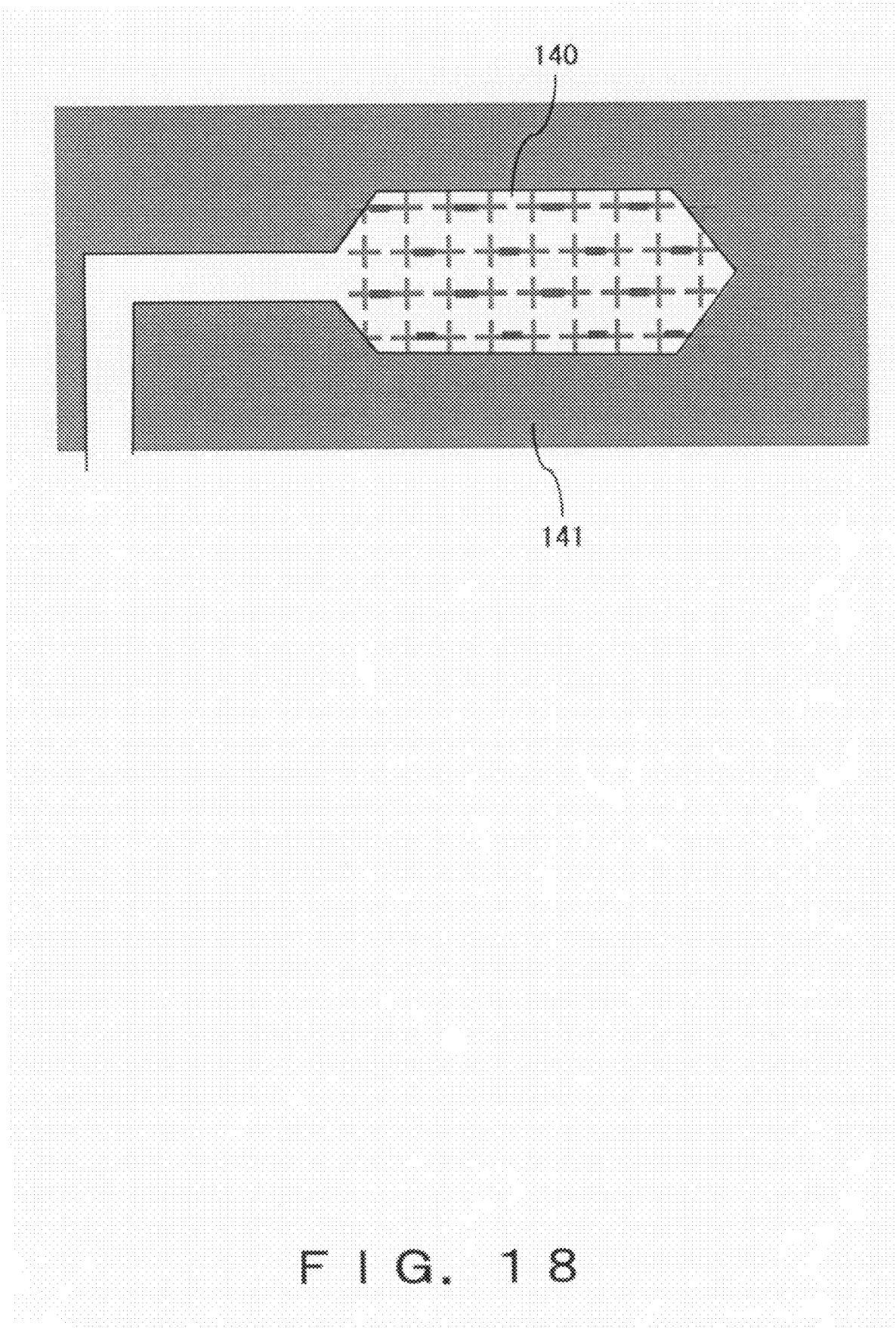
FIG. 18 is a horizontal cross-sectional diagram of a segment in an LCD element according to a seventh embodiment.

FIG. 18 is a horizontal cross-sectional diagram of a segment in an LCD element according to eighth embodiment.

The segment 140 shown in FIG. 18 is a modification of the segment 120 shown in FIG. 16, and has pillars 141 combining the left edge of a pillar on one side of the adjacent two pillars with the right edge of a pillar on the other side within segment 120. Because segment 140 combines two pillars 121 together that were adjacent to each other in segment 120, there are fewer openings in segment 140 than segment 120. The pillars 121 are combined so as to not form a closed zone within segment 140. This is done so that the liquid crystals can be injected into the entirety of the zone within the segment 140, but not injected into the pillars 141. Such a structure improves the durability against a uniformly distributed load of the LCD element according to the eighth embodiment as compared to the LCD element according to the sixth embodiment. Also, because the ratio of the area of the pillars to the total area in the cross-section of segment 140 is larger than that of segment 120, the durability against a concentrated load is also improved as compared to the LCD element according to the sixth embodiment.

Embodiment 9

Figure 19:
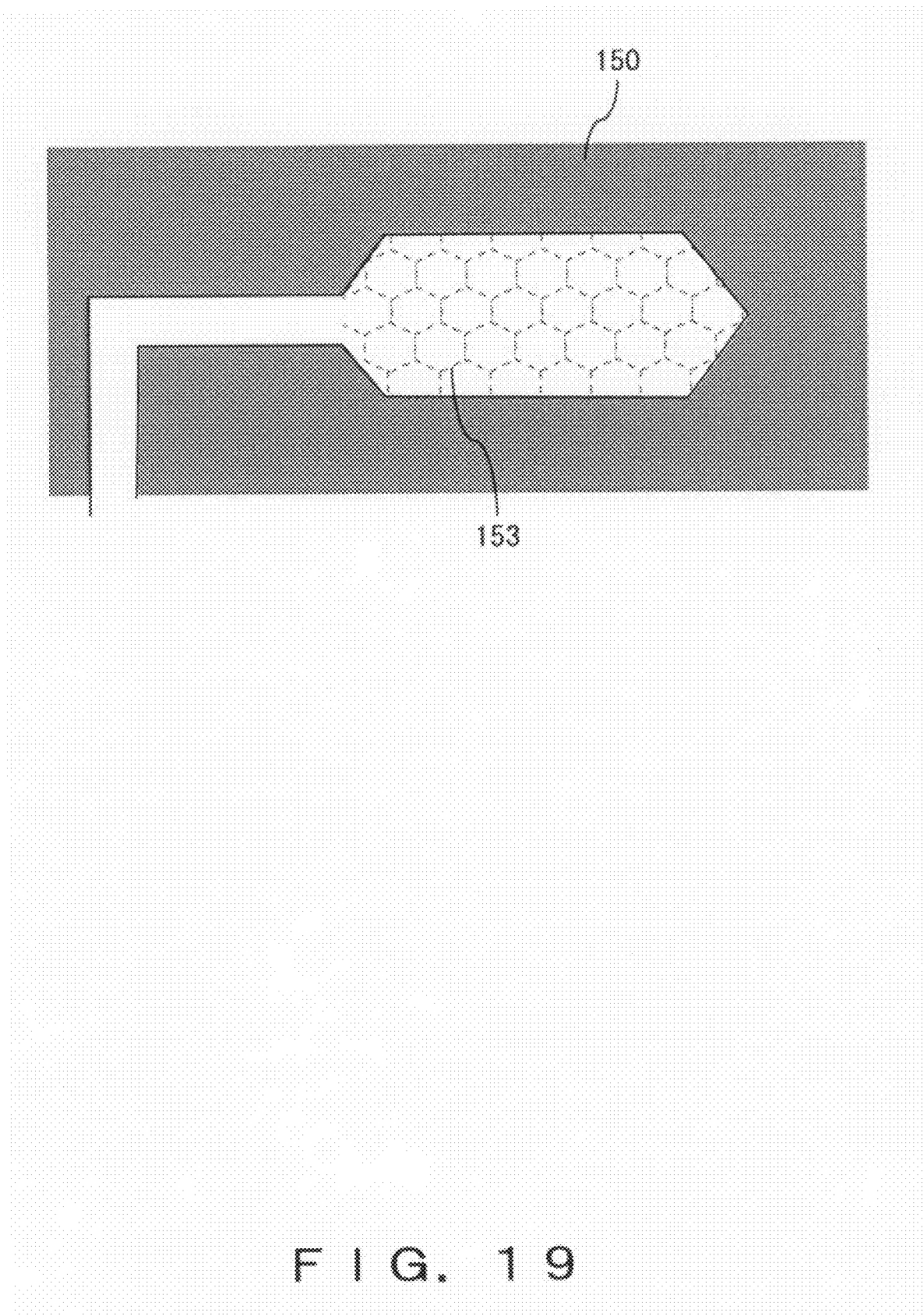
FIG. 19 is a horizontal cross-sectional diagram of a segment in an LCD element according to an eighth embodiment.

FIG. 19 is a horizontal cross-sectional diagram of a segment in an LCD element according to ninth embodiment.

The segment 150 shown in FIG. 19 is a modification of the approximate honeycomb-structured segment 130 shown in FIG. 17, and is configured to equip only two edges of the hexagon with openings 153. Because of this, the fluidity of liquid crystals from the inside of the segment to the outside is further limited as compared to segment 130, and the durability against a uniformly distributed load of the LCD element according to the ninth embodiment is improved as compared to the LCD element according to embodiment 7. Also, because the area occupied by the pillars within the segment cross-section is larger than that of segment 130, the durability against a concentrated load is also improved as compared to the LCD element according to the seventh embodiment.

It is also possible to form pillars on the inside of a segment even if the segment is structured to have no injection path for liquid crystals, as shown in FIG. 11, making it possible to obtain an improvement in the durability against a uniformly distributed load as well as a concentrated load by forming pillars in such a segment.

Injection times are expected to be longer for liquid crystals with fewer openings; problem-free manufacturing of an LCD element, however, is possible by raising the temperature of the liquid crystals at the time of injecting it, thereby reducing the viscosity of the liquid crystals.

As described above, the preferred embodiments of the present invention are capable of preventing a change in display states that might result from pressure on the display surface, which has been a problem unique to bistable cholesteric LCD elements. The embodiments are also capable of preventing deformation of a sturdy liquid crystal cell due to warpage, thereby making it possible to provide an IC card having a display function of superior convenience if it is adopted as a display element of the IC card.

The above-mentioned embodiments are applications of the present invention to an LCD element of a segment display; the present invention, however, is also applicable to an LCD element of a dot matrix display and is not limited to the embodiments. Also note that the present invention provides an effective structure for preventing a change in display, which is a problem unique to a cholesteric LCD element having a superior bistability; the structures of the present invention, however, are applicable to an improvement in the durability of other LCD elements.

The present invention is preferably applicable to a display unit in portable devices in which thinner bodies are demanded such as wristwatches and portable terminals including portable phones, PDAs (personal digital assistants), and other such devices. It is also applicable to a display unit in various kinds of electronic equipment such as touch panel type displays, electronic paper, on-board panels in automobiles, and other such equipment, in addition to a display unit in an IC card.

What is claimed is:

1. A liquid crystal display (LCD) element employing a cholesteric liquid crystal which comprises opposing substrates, a wall structure equipped between the substrates, a plurality of segment blocks constituted by a plurality of segments whose sides are surrounded by the wall structure, and a liquid crystal injection path, whose sides are surrounded by the wall structure, connecting the segment blocks, comprising:
   a plurality of segment blocks, each of which comprises one or more segments connected to only one liquid crystal injection path for liquid crystals, wherein
   the liquid crystal injection path includes an S-shaped structure with at least one corner.

2. The LCD element according to claim 1, wherein
   each segment is connected to only one liquid crystal injection path for liquid crystals in all segment blocks.

3. The LCD element according to claim 1, wherein
   said liquid crystal injection path has multiple corner parts.

4. The LCD element according to claim 1, wherein
   said segment is internally equipped with a pillar for supporting said opposite substrates.

5. The LCD element according to claim 4, wherein
   said pillar is made of the same material as said wall structure.

6. The LCD element according to claim 4, wherein
   said pillar is a solid with the horizontal section shaped like a cross.

7. The LCD element according to claim 6, wherein
   said pillar of which the horizontal section is shaped like a cross is connected to an adjacent pillar so as to not form a closed zone within a segment.

8. The LCD element according to claim 4, wherein
   said pillar is an approximate honeycomb structure with a plurality of sides forming an approximate honeycomb structure having respective openings.

9. A liquid crystal display (LCD) element employing a cholesteric liquid crystal which comprises opposing substrates, a wall structure equipped between the substrates, a plurality of segment blocks constituted by a plurality of segments whose side surfaces are surrounded by the wall structure, wherein
   each segment block is not connected to another segment block, and a liquid crystal injection path includes an S-shaped structure with at least one corner.

10. The LCD element according to claim 9, wherein
    said segment is internally equipped with a pillar for supporting said opposing substrates.

* * * * *